United States Patent [19]

Reed et al.

[11] Patent Number: 5,223,283
[45] Date of Patent: Jun. 29, 1993

[54] LOW FAT COCOA POWDER IN SYNTHETIC CHEWING GUM BASE

[75] Inventors: Michael A. Reed, Evanston; Pamela M. Mazurek, Chicago; Jeffrey S. Hook, Palos Hills, all of Ill.

[73] Assignee: Wm. Wrigley Jr. Company, Chicago, Ill.

[21] Appl. No.: 873,591

[22] Filed: Apr. 21, 1992

Related U.S. Application Data

[63] Continuation of Ser. No. 593,248, Oct. 5, 1990, abandoned.

[51] Int. Cl.$^5$ ............................................... H23G 3/30
[52] U.S. Cl. ........................................... 426/3; 426/4; 426/5; 426/631
[58] Field of Search ............................ 426/3, 4, 5, 631

[56] References Cited

U.S. PATENT DOCUMENTS 4,889,727 12/1989 Dove et al. ............................. 426/3

FOREIGN PATENT DOCUMENTS

WO90/02492 3/1990 PCT Int'l Appl. .
2223944 4/1990 United Kingdom .

OTHER PUBLICATIONS

Minifie, "Chocolate, Cocoa and Confectionary . . . " 1980 pp. 55-56.
"Extrusion: Does Chewing Gum Pass The Taste Test?", *Food Manuacture*, Sep., 1987.

Primary Examiner—Joseph Golian
Assistant Examiner—Evan Federman
Attorney, Agent, or Firm—Willian Brinks Olds Hofer Gilson & Lione

[57] ABSTRACT

There is disclosed a synthetic non-chocolate flavored chewing gum base which is substantially free of natural gum products, as well as a method of making such a gum base. The gum base includes between about 10 and about 30 percent of a synthetic elastomer, between about 20 and about 70 percent of a synthetic resin, and between about 0.3 and about 2.4 percent cocoa powder. In accordance with the present invention, the cocoa powder has a fat content of less than about 1 percent.

21 Claims, No Drawings

LOW FAT COCOA POWDER IN SYNTHETIC CHEWING GUM BASE

This application is a continuation of application Ser. No. 07/593,248, filed Oct. 5, 1990, now abandoned.

BACKGROUND OF THE INVENTION

The present invention relates to the field of chewing gum base and chewing gum made therewith, and particularly to synthetic chewing gum base.

U.S. Pat. No. 4,889,727, assigned to the assignee of the present application, describes an enhancement to a synthetic chewing gum base which involves the addition of a minor amount of cocoa powder to the base or to the chewing gum in which the base is used.

The preferred level of the cocoa powder in the synthetic chewing gum base was stated to be between about 0.3 and 2.4 percent by weight of the gum base. At this minor level, the cocoa powder should not contribute a chocolate flavor to the gum base. It was reported, nevertheless, that the presence of this low level of cocoa powder contributed to the overall flavor of the synthetic gum base in such a way as to make the synthetic gum base taste more like a natural gum base.

The enhancement of the flavor of a synthetic chewing gum base to taste more like that of a natural gum base provides the advantage in that it allows a chewing gum manufacturer to convert from a natural base to a synthetic gum base without significant alteration of the flavor profile of the chewing gum.

Unfortunately, the addition of cocoa powder to gum base at the plant scale posed a certain problem. Specifically, when gum base is made it is typically screened through a nylon 80 mesh screen (180 microns) to reduce impurities in accordance with Good Manufacturing Practice. It was found that when the cocoa powder was added directly to the gum base during manufacturing, it blocked the purifying screen. This was surprising in light of the fact that the specification for the cocoa powder being used was for a particle size of 99.5% through a 200 mesh screen (74 microns). In other words, the particles of cocoa powder should have passed through the 80 mesh screen.

SUMMARY OF THE INVENTION

Briefly stated, one aspect of the present invention is directed to a synthetic non-chocolate flavored chewing gum base which is substantially free of natural gum products. The gum base includes between about 10 and about 30 percent of a synthetic elastomer, between about 20 and about 70 percent of a synthetic resin, and between about 0.3 and about 2.4 percent cocoa powder. In accordance with the present invention, the cocoa powder has a fat content of less than about 1 percent.

The method aspect of the present invention is directed to a method of making a synthetic nonchocolate flavored chewing gum base which is substantially free of natural gum products. This method includes the steps of mixing between about 10 and about 30 percent of a synthetic elastomer, between about 20 and about 70 percent of a synthetic resin, and between about 0.3 and about 2.4 percent cocoa powder. In accordance with the present invention, the cocoa powder has a fat content of less than about 1 percent.

The present invention has been found to be advantageous in that, when the low fat cocoa powder is used, the gum base does not block the purifying screen. Consequently, the advantages disclosed in U.S. Pat. No. 4,889,727 can be achieved without altering the manufacturing process of the synthetic chewing gum base.

Unless otherwise specified, the term "percent" and its symbol "%" are intended to refer to percent by weight of the chewing gum base.

The present invention, together with attendant objects and advantages, will be best understood with reference to the detailed description of the preferred embodiments below.

DETAILED DESCRIPTION OF THE PREFERRED EMBODIMENTS

Chewing gum bases generally comprise a combination of elastomers and resins together with plasticizers and inorganic fillers. In accordance with the present invention, the chewing gum base is substantially free of natural gum products and contains a synthetic elastomer, a synthetic resin, and a minor amount of cocoa powder. In the method aspect of the present invention, the cocoa powder is added to the other ingredients during formulation of the gum base.

Many of the details of the preferred embodiment of the present invention are the same as those disclosed in the above-referred-to U.S. Pat. No. 4,889,727 ("the '727 patent"). Accordingly, the entire disclosure of the '727 patent is incorporated herein by reference.

The cocoa powder used in the present invention can be any of a variety of types so long as the fat content of the cocoa powder is less than about 1%. A dutch process cocoa powder with less than 1% fat is preferred. Most preferably, the fat content of the cocoa powder is less than about 0.4%.

Most preferably, the cocoa powder is that sold by SHOEMAKER under the designation "Olympus ® low fat cocoa powder.

The amount of cocoa powder added to the synthetic gum base should be between about 0.3 and about 2.4 percent by weight of the chewing base. As described in the '727 patent, this range was found to be important. In particular, it was important to keep the level of cocoa powder below that level at which a chocolate flavor would be detected. It was also important to add enough cocoa powder so that the flavor enhancement was detectable. Preferably the level of cocoa powder is between about 0.3 and 1.5 percent, most preferably between about 0.6 and about 1.5 percent.

As disclosed in the '727 patent, synthetic elastomers may include polyisoprene, polysiobutylene, isobutylene-isoprene copolymer, sytrene butadiene rubber, and the like. Of these polyisoprene, polyisobutylene, and isobutyleneisoprene copolymer are preferred, with the copolymer being most preferred. A copolymer from Exxon Corp. sold under the designation "butyl rubber" is suitable for use in the most preferred embodiment.

The amount of synthetic elastomer used in the gum base can be varied between about 10 and about 20 percent depending on the specific elastomer selected and on the physical properties desired in the final gum base. For example, the viscosity, softening point, and elasticity can be varied. When butyl rubber is used, it is preferred to include between about 10 and about 20 percent and most preferred to use about 12 percent.

Synthetic resins include polyvinyl acetate, polyethylene, ester gums (resin esters of glycerol), and polyterpenes. As stated in the '727 patent, polyterpenes, polyethylene and polyvinyl acetate are preferred, with a combination of polyvinyl acetate and polyterpenes being most preferred. A polyvinyl acetate obtained from MONSANTO under the designation "Gelva" is a suitable polyvinyl acetate for use in the most preferred embodiment. A polyterpene obtained from HERCULES under the designation "Piccolytye" is suitable for use in the most preferred embodiment.

The amount of synthetic resin used can also be varied depending on the particular resin selected and the physical properties desired in the final gum base.

Preferably, the synthetic gum base of the present invention also includes plasticizers selected from the group consisting of fats, oils, waxes, and mixtures thereof. The fats and oils can include tallow, hydrogenated and partially hydrogenated vegetable oils, and cocoa butter. Commonly employed waxes include paraffin, microcrystalline and natural waxes such as beeswax and carnauba. The most preferred embodiment uses a mixture of paraffin wax and partially hydrogenated vegetable oil and glycerol monostearate.

The amount of plasticers used can vary between about 10 and about 40 percent. In the most preferred embodiment, the total plasticer includes paraffin wax at about 13 percent and cottonseed oil at about 2 percent, and glycerol monostearate at about 6 percent.

Preferably, the gum base also includes a filler component. The filler component is preferably selected from the group consisting of calcium carbonate, magnesium carbonate, talc, dicalcium phosphate and the like. The filler may constitute between about 5 and about 60 percent by weight of the gum base. Preferably, the filler comprises about 5 to about 50 percent by weight of the gum base.

The gum base of the present invention may also contain optional ingredients such as antioxidants, colors, and emulsifiers.

These ingredients of the gum base can be combined in a conventional manner. In particular, the synthetic elastomer, synthetic resins, plasticizers, filler, and the cocoa powder can be added to a mixing vessel. The ingredients are typically softened by heating to between 220 to 250 deg. F. and then mixed at that temperature for a time sufficient to insure a homogenous mass, typically between 1 to 2 hours.

The molten base mass is then pumped through a nylon mesh filter screen of about 60 mesh (250 microns) to about 100 mesh (150 microns). Preferably an 80 mesh (180 microns) nylon filter is used. During filtering, the molten base mass is kept at a temperature between about 215 to 250 deg. F. For synthetic bases, this is the one and only filtering stage to remove particulate contaminants in accordance with Good Manufacturing Practices.

After filtering, the mass or base can be formed into slabs or pellets and allowed to cool before use in making chewing gum. Alternatively, the molten mass can be used directed in a chewing gum manufacturing process.

In accordance with an alternative embodiment, a special cocoa powder-rich base preblend can be prepared for use in subsequent blending with non-cocoa powder containing base to achieve the desired level in the ultimate base used in the chewing gum. This cocoa powder-rich preblend preferably contains between about 10 and about 50 percent cocoa powder by weight of the preblend.

Typically, the gum base constitutes between about 5 to about 95 percent by weight of the gum. More preferably the insoluble gum base comprises between 10 and 50 percent by weight of the gum and most preferably about 20 to about 35 percent by weight of the gum.

As with the '727 patent, the remainder of the chewing gum ingredients are seen to be noncritical to the present invention. That is, the chewing gum base of the present invention can be incorporated into conventional chewing gum formulations in a conventional manner.

In general, a chewing gum composition typically comprises a water soluble bulk portion and a water insoluble chewable gum base portion, and water insoluble flavoring agents. The water soluble portion dissipates with a portion of the flavoring agent over a period of time during chewing. The gum base portion is retained in the mouth throughout the chew.

The water soluble portion of the chewing gum may further comprises softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum. Preferably, the chewing gum contains about 1 percent glycerine.

Sugar sweeteners generally include saccharide containing components commonly known in the chewing gum art which include but are not limited to sucrose, glucose, dextrose, dextrin, dried invert sugar, fructose, levulose, galactose, corn syrup solids, and the like, alone or in any combination. In the preferred embodiment, the water soluble sweetener portion is a mixture of sugar at about 50 percent of the final chewing gum, dextrose monohydrate at about 10 percent, and corn syrup at about 17 percent.

In alternative embodiments, the invention can be used in a sugarless chewing gum. Generally sugarless sweeteners include components with sweetening characteristics but are devoid of the commonly known sugars and comprise but are not limited to high-potency sweeteners and/or sugar alcohols. Suitable high-potency sweeteners include aspartame, alitame, salts of acesulfame, saccharine and its salts, cyclamic acid and its salts, glycyrrhizin, sucralose, thaumatin, and monellin, as well as combinations thereof. Suitable sugar alcohols include sorbitol, mannitol, xylitol, hydrogenated starch hydrolysates, maltitol, and the like, as well as combinations thereof. Preferably, the sugarless gum embodiment of the present invention comprises a combination of a high-potency sweetener with a sugar alcohol, more preferably aspartame and sorbitol.

A flavoring agent is typically present in the chewing gum in an amount within the range of from about 0.1 to about 10.0 weight percent and preferably from about 0.5 to about 3.0 weight percent of the gum. The flavoring agents may comprise essential oils, synthetic flavors, or mixture thereof including but not limited to oils derived from plants and fruits such as citrus oils, fruit essences, peppermint oil, spearmint oil, clove oil, oil of wintergreen, anise, and the like. Artificial flavoring components are also contemplated. Those skilled in the art will recognize that natural and artificial flavoring agents may be combined in any sensorially acceptable blend. With the exception of those which would produce a chocolate flavored gum, all such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time along with syrup and a portion of bulking agent. Further portions of the bulking agent may then be added to the mixer. A flavoring agent is typically added with the final portion of the bulking agent. The twice coated sweetener of the present invention is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

EXAMPLES

The following examples are provided by way of explanation and illustration. As such, these examples are not to be viewed as limiting the scope of the invention as defined by the appended claims.

EXAMPLES 1-3 AND COMPARATIVE EXAMPLES 4, 5 and 6

Six batches of gum base preblends were made with the following ingredients in the following percentages by weight:

|  | 1 & 4 | 2 | 3 & 5 | 6 |
|---|---|---|---|---|
| Polyvinyl Acetate | 20.2 | 17.6 | 16.2 | 13.5 |
| Paraffin Wax | 9.0 | 7.8 | 7.2 | 6.0 |
| Synthetic Rubber | 9.8 | 8.4 | 7.8 | 6.5 |
| Terpene Resins | 19.5 | 16.9 | 15.6 | 13.0 |
| Calcium Carbonate | 9.0 | 7.8 | 7.2 | 6.0 |
| Glycerol Monostearate | 3.8 | 3.2 | 3.0 | 2.5 |
| Fat | 2.3 | 2.0 | 1.8 | 1.5 |
| Lecithin | 1.4 | 1.3 | 1.2 | 1.0 |
| Cocoa Powder | 25.0 | 35.0 | 40.0 | 50.0 |

The cocoa powder used in Examples 1, 2 and 3 was the Shoemaker Olympus ® Cocoa Powder Alkalized Type A-7. The cocoa powder used in comparative Examples 4, 5 and 6 was a Sudan Dutch Cocoa with a fat content of between 10 and 12 percent. The gum bases made in Examples 1-5 were all filtered through a 80 mesh nylon screen. The gum base made in Example 6 was not filtered. It was noted that there was no clogging of this screen in Examples 1-3, while the screen was severely clogged in Example 4 and 5 and no base was usable from these examples.

While not wishing to be bound by any particular theory, it is currently believed that the beneficial effect of using cocoa powder with a fat content below about 1 percent can be explained as follows. It may be that clogging of the screens which occurred with conventional cocoa powder may have been caused by some sort of agglomeration of the fat present in the cocoa powder with some other ingredient(s) of the chewing gum base. This could explain why even though the cocoa powder, of which 99.5% should pass through a 200 mesh screen, would contribute to clogging of the screen. If this is correct, then the use of cocoa powder with less than about 1 percent fat would alleviate the problem. Regardless of the accuracy of the present theory, the beneficial result of no clogging on the screens has been observed when the low fat cocoa powder is used. Consequently, the scope of Applicants' invention should not be affected by this theory.

EXAMPLES 1-9 AND COMPARATIVE EXAMPLE 10

Four batches of chewing gum were made with the following ingredients in the following percentages:

|  | 7 | 8 | 9 | 10 |
|---|---|---|---|---|
| Non-cocoa Base | 20.266 | 20.376 | 20.41 | 20.395 |
| Base from Ex. 1 | 0.384 | | | |
| Base from Ex. 2 | | 0.274 | | |
| Base from Ex. 3 | | | 0.240 | |
| Base from Ex. 6 | | | | 0.255 |
| Sugar | 49.95 | 49.95 | 49.95 | 49.95 |
| Corn Syrup | 16.9 | 16.9 | 16.9 | 16.9 |
| Dextrose Monohydrate | 10.2 | 10.2 | 10.2 | 10.2 |
| Hydrated Lecithin | 0.3 | 0.3 | 0.3 | 0.3 |
| Glycerin | 1.0 | 1.0 | 1.0 | 1.0 |
| Aspartame | 0.1 | 0.1 | 0.1 | 0.1 |
| 10% Salt Solution | 0.1 | 0.1 | 0.1 | 0.1 |
| Spearmint Flavor | 0.8 | 0.8 | 0.8 | 0.8 |

In Examples 7-10, the appropriate amount of the cocoa powder containing base preblend from examples 1-3 and 6, respectively, were used with a non-cocoa powder containing base which was otherwise identical. The amount of cocoa powder containing base for examples 7-9 was selected so as to provide cocoa powder in the final gum product of 0.096 percent by weight. For Example 10, the amount was selected so as to achieve a cocoa powder level of about 0.13 percent. The chewing gum made in these examples was chewed by a panel of experts. No sensory differences were observed between the four chewing gums thus made.

EXAMPLE 11 AND 12

Example 12 was made in accordance with the most preferred embodiment. Example 11 was made in accordance with a slightly less preferred embodiment. In both examples, the cocoa powder was added in the desired amount to the ultimate gum base. The gum bases were made with the following formulas:

|  | 11 | 12 |
|---|---|---|
| Polyvinyl Acetate | 27.0 | 27.2 |
| Paraffin Wax | 12.2 | 12.5 |
| Synthetic Rubber | 12.4 | 12.5 |
| Terpene Resins | 25.5 | 25.7 |
| Calcium Carbonate | 12.2 | 12.4 |
| Glycerol Monostearate | 4.6 | 4.6 |
| Fat | 3.2 | 3.2 |
| Lecithin | 1.4 | 1.5 |
| Cocoa Powder | 1.5 | 0.6 |

These bases were made as described above, including a filtering through 80 mesh nylon screens. No clogging of the screens was observed.

These base was used in making peppermint flavored gum batches having the following forumula:

| Base | 19.7 |
|---|---|
| Sugar | 55.2 |
| Corn Syrup | 12.7 |
| Dextrose Monohydrate | 9.9 |
| Hydrated Lecithin | 0.3 |
| Glycerin | 1.3 |
| Peppermint Flavor | 0.9 |

The gum made in both of these examples had good flavor characteristics and typical brown color. The gum of example 11 was slightly darker.

In summary, the present invention provides the advantage of adding cocoa powder to a synthetic chewing gum base without the disadvantage of clogging filters. Although specific embodiments and examples have been described herein, it should be borne in mind that these have been provided by way of explanation and illustration and that the present invention is not to be limited thereby. Certainly modifications which are within the ordinary skill in the art to make are considered to lie within the scope of the invention as defined by the following claims, including all equivalents.

We claim:

1. A synthetic, non-chocolate flavored chewing gum base which is substantially free of natural gum products, the gum base comprising:
   about 10 to about 30 weight percent of a synthetic elastomer;
   about 20 to about 70 weight percent of a synthetic resin; and
   about 0.3 to about 2.4 weight percent of a cocoa powder which consists essentially of cocoa powder having a fat content of less than and not exceeding about 1 weight percent of the cocoa powder;
   wherein the gum base has been filtered through a screen having a pore size of about 250 microns or smaller, and is substantially free of impurities.

2. The gum base of claim 1 wherein the cocoa powder has a fat content of less than and not exceeding about 0.4 weight percent.

3. The gum base of claim 1 wherein the cocoa powder is present in an amount of about 0.6 to about 1.5 weight percent.

4. A method of making a synthetic non-chocolate flavored chewing gum base which is substantially free of natural gum products, comprising the steps of:
   providing a cocoa powder which consists essentially of cocoa powder having a fat content of less than and not exceeding about 1 weight percent of the cocoa powder;
   mixing about 10 to about 30 weight percent of a synthetic elastomer, about 20 to about 70 weight percent of a synthetic resin, and about 0.3 to about 2.4 weight percent of the cocoa powder to form a gum base mixture; and
   filtering the gum base mixture through a screen having a pore size of about 250 microns or smaller, to remove impurities.

5. The method of claim 4 wherein the gum base mixture is filtered through a screen having a pore size of about 180 microns or smaller.

6. The method of claim 4 wherein the gum base mixture is filtered through a screen having a pore size of about 150 microns or smaller.

7. The gum base of claim 1, wherein the synthetic elastomer is selected from the group consisting of polyisoprene, polyisobutylene, isobutylene-isoprene copolymer, styrene butadiene rubber, and combinations thereof.

8. The gum base of claim 1, wherein the synthetic elastomer comprises isobutylene-isoprene copolymer.

9. The gum base of claim 1, wherein the synthetic elastomer is present at about 10 to about 20 weight percent of the gum base.

10. The gum base of claim 1, wherein the synthetic resin is selected from the group consisting of polyvinyl acetate, polyethylene, ester gums, polyterpenes, and combinations thereof.

11. The gum base of claim 1, wherein the synthetic resin comprises a combination of polyvinyl acetate and polyterpenes.

12. The gum base of claim 1, further comprising about 10 to about 40 weight percent of a plasticizer.

13. The gum base of claim 12, wherein the plasticizer is selected from the group consisting of fats, oils, waxes, and combinations thereof.

14. The gum base of claim 1, further comprising about 5 to about 60 weight percent of a filler.

15. The gum base of claim 14, wherein the filler is selected from the group consisting of calcium carbonate, magnesium carbonate, talc, dicalcium phosphate, and combinations thereof.

16. A chewing gum comprising the gum base of claim 8.

17. A method of preparing a synthetic non-chocolate flavored chewing gum base which is substantially free of natural gum products, comprising the steps of:
   adding about 10 to about 30 weight percent of a synthetic elastomer selected from the group consisting of polyisoprene, polyisobutylene, isobutylene-isoprene copolymer, styrene butadiene rubber, and combinations thereof, to a mixer;
   adding about 20 to about 70 weight percent of a synthetic resin selected from the group consisting of polyvinyl acetate, polyethylene, ester gums, polyterpenes, and combinations thereof, to the mixer;
   adding about 0.3 to about 2.4 weight percent of a cocoa powder which consists essentially of cocoa powder having a fat content of less than and not exceeding about 1 weight percent of the cocoa powder;
   mixing the components together to form a homogeneous mass; and
   filtering the gum base through a screen having a pore size of about 250 microns or smaller.

18. The method of claim 17, wherein the cocoa powder has a fat content of less than and not exceeding about 0.4 weight percent.

19. The method of claim 17, wherein the cocoa powder is added in an amount of about 0.6 to about 1.5 weight percent of the gum base.

20. A method of preparing a synthetic non-chocolate flavored chewing gum base which is substantially free of natural gum products, comprising the steps of:
   preparing a cocoa powder-rich base preblend by mixing about 10 to about 30 weight percent synthetic resin, about 20 to about 70 weight percent synthetic elastomer and about 10 to about 50 weight percent cocoa powder, together in a mixer;

filtering the cocoa powder-rich base preblend through a screen having a pore size of about 250 microns or smaller; and blending the cocoa powder-rich base preblend with a non-cocoa powder containing base to obtain a blend which comprises about 0.3 to about 2.4 weight percent cocoa powder;

wherein the cocoa powder consists essentially of cocoa powder having a fat content of less than and not exceeding about 1 weight percent of the cocoa powder.

21. The method of claim 20, wherein the cocoa powder has a fat content of less than and not exceeding about 0.4 weight percent.

* * * * *

UNITED STATES PATENT AND TRADEMARK OFFICE
CERTIFICATE OF CORRECTION

PATENT NO. : 5,223,283
DATED : June 29, 1993
INVENTOR(S) : Michael A. Reed et al.                               Page 1 of 2

It is certified that error appears in the above-indentified patent and that said Letters Patent is hereby corrected as shown below:

In column 1, line 57, delete "nonchocolate" and substitute therefor --non-chocolate--.

In column 2, line 50, delete "sytrene" and substitute therefor --styrene--.

In column 2, line 52, delete "isobutyleneisoprene" and substitute therefor --isobutylene-isoprene--.

In column 3, line 20, delete "plasticers" and substitute therefor --plasticizers--.

In column 3, line 22, delete "plasticers" and substitute therefor --plasticizers--.

In column 4, line 16, delete "comprises" and substitute therefor --comprise--.

In column 5, line 63, delete "Example" and substitute therefor --Examples--.

In column 6, line 49, in the heading delete "EXAMPLE" and substitute therefor --EXAMPLES--.

In column 7, line 4, delete "base was" and substitute therefor --bases were--.

UNITED STATES PATENT AND TRADEMARK OFFICE
CERTIFICATE OF CORRECTION

PATENT NO. : 5,223,283
DATED : June 29, 1993
INVENTOR(S) : Michael A. Reed et al.

It is certified that error appears in the above-indentified patent and that said Letters Patent is hereby corrected as shown below:

Col. 8, In claim 16, line 2, delete "8" and substitute therefor --1--.

Signed and Sealed this

Ninth Day of August, 1994

Attest:

BRUCE LEHMAN

Attesting Officer     Commissioner of Patents and Trademarks